June 27, 1933.  E. M. COLE  1,915,816
STEERING APPARATUS FOR WHEELED FRAMES
Filed Jan. 18, 1932  3 Sheets-Sheet 1
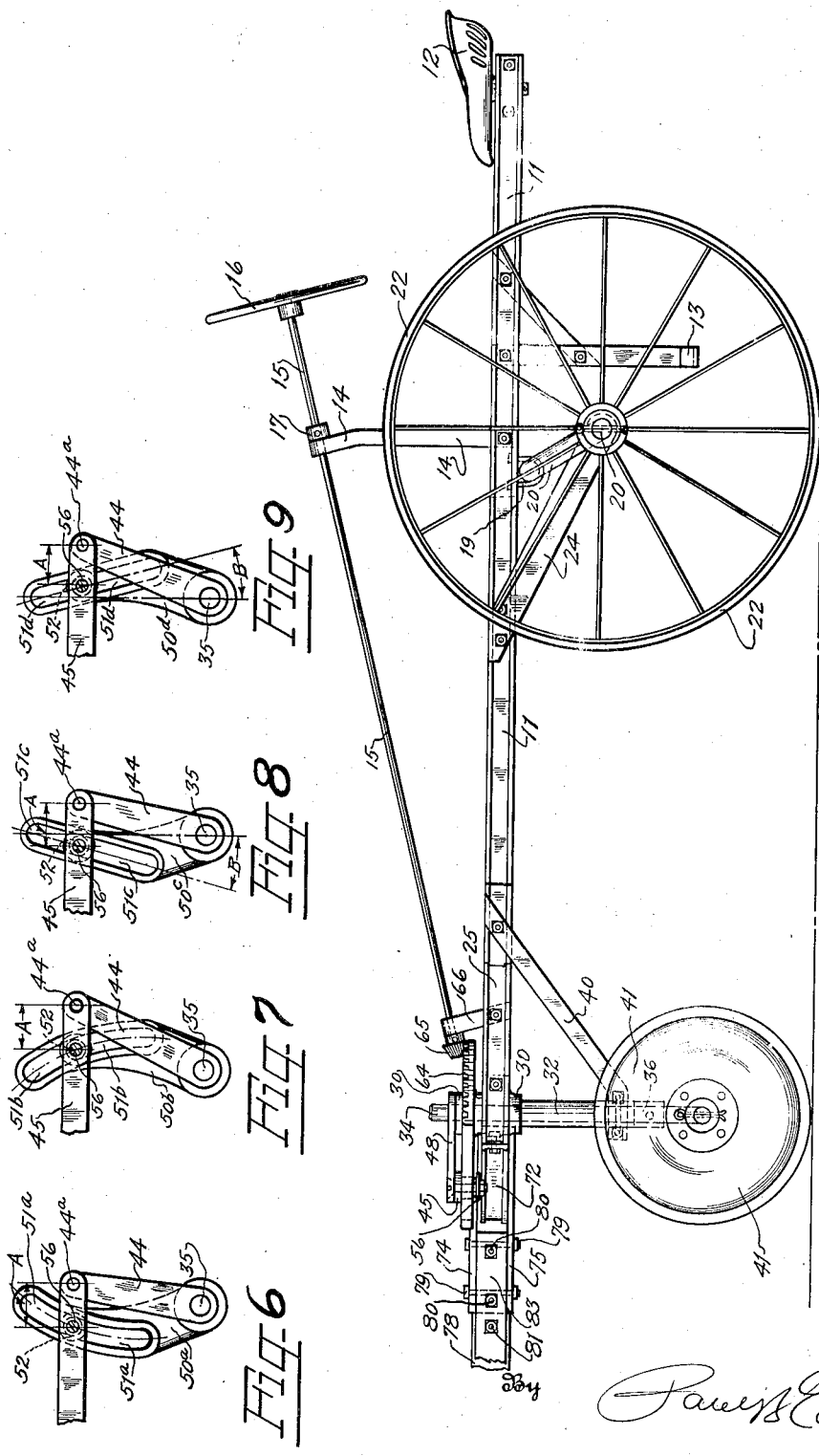
Inventor:
E. M. Cole

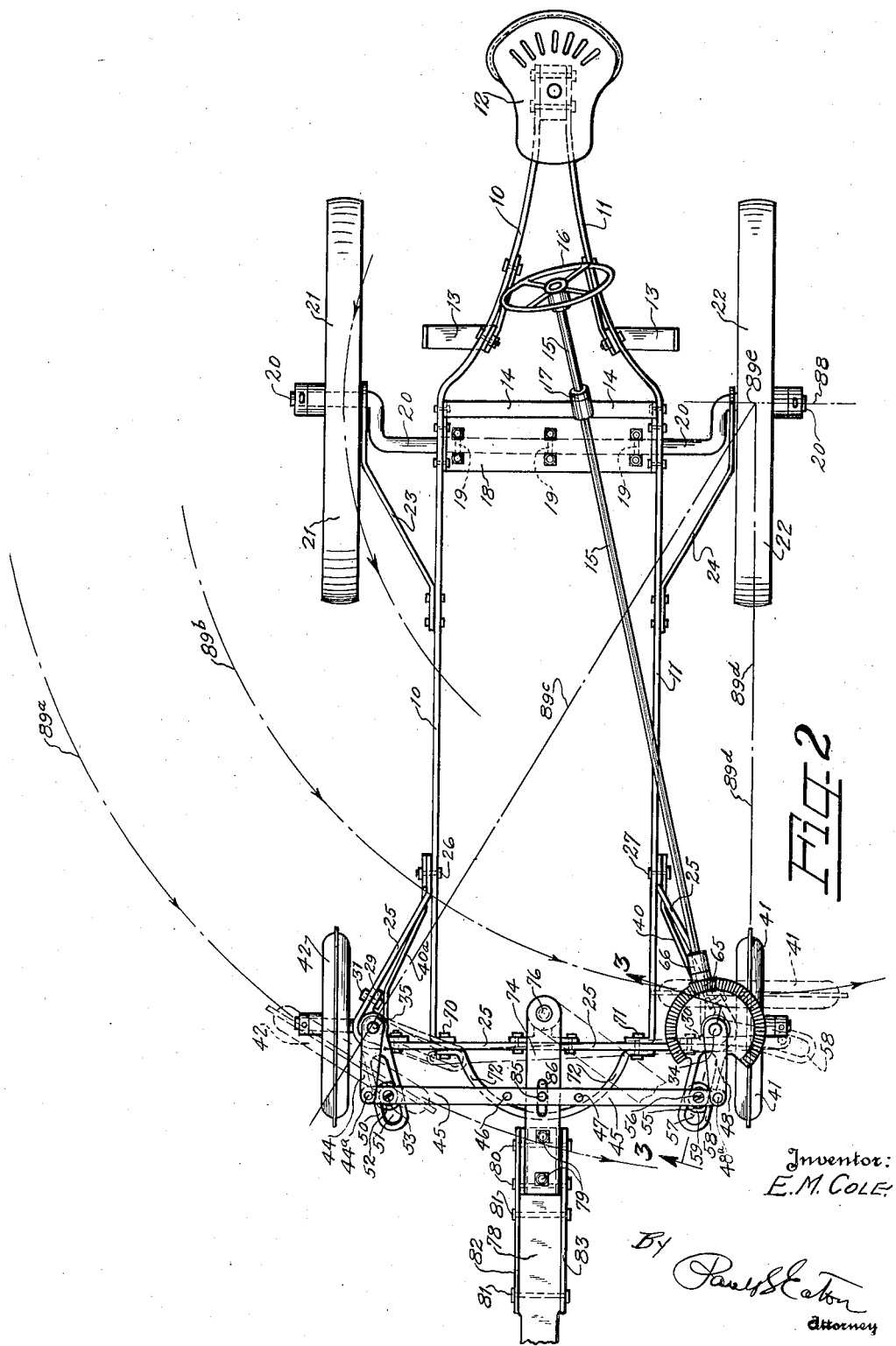

June 27, 1933. E. M. COLE 1,915,816
STEERING APPARATUS FOR WHEELED FRAMES
Filed Jan. 18, 1932 3 Sheets-Sheet 3
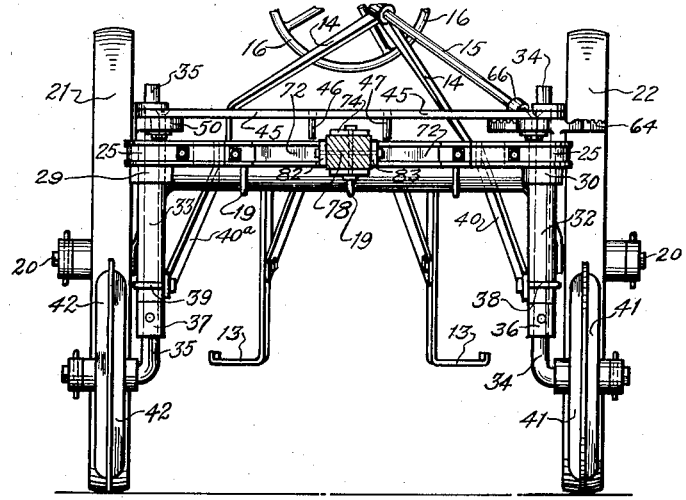
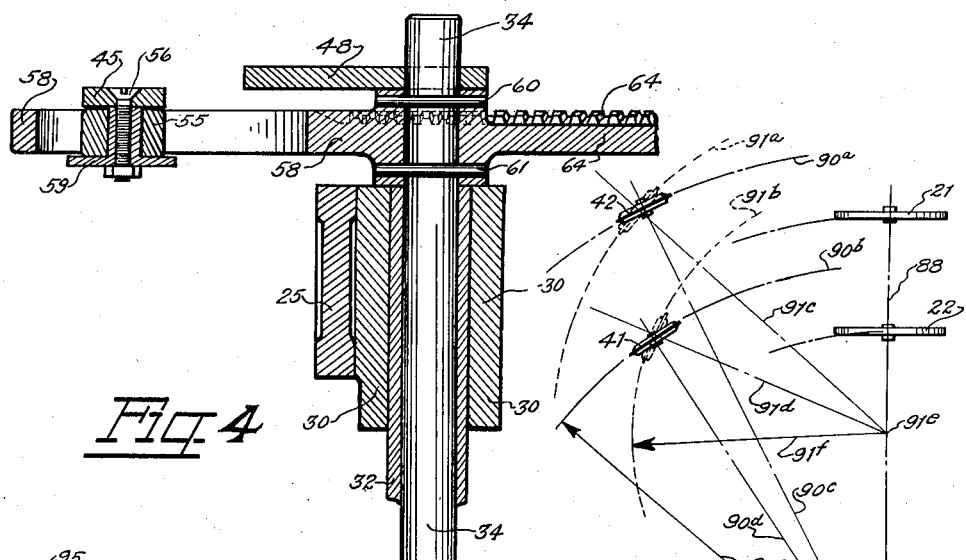
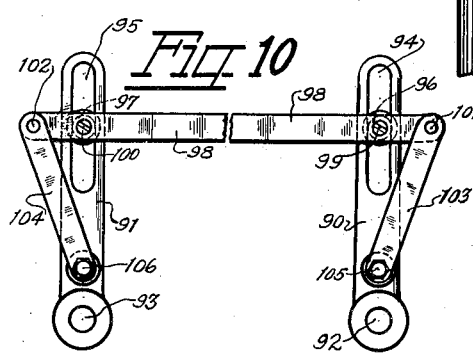
Inventor:
E. M. Cole
By Paul S. Eaton
Attorney Patented June 27, 1933

1,915,816

UNITED STATES PATENT OFFICE

EUGENE M. COLE, OF CHARLOTTE, NORTH CAROLINA

STEERING APPARATUS FOR WHEELED FRAMES

Application filed January 18, 1932. Serial No. 587,368.

This invention relates to a steering mechanism for a wheeled frame in which the arc described by each of the front wheels, while turning, has a radius originating at a common center.

This invention relates to a steering mechanism for a wheeled frame in which the arc described by each of the front wheels, while turning, has a radius originating at a common center disposed along a line passing longitudinally thru a line drawn transversely of the frame at a point approximately where rear wheels touch the ground, so that the four wheels of the device turn along arcs which have a common center which offers the minimum of friction.

An object of this invention is to provide a wheeled frame having means for steering the same so that, regardless of the degree to which the front wheels are turned, a line extending longitudinally thru the hub portion of one wheel will meet a line extending thru the hub portion of the other front wheel at a common point, with said common point being disposed along a line disposed transversely of the frame and located beneath the hub portions of the rear wheels so as to cause the turning of the wheeled frame to be accomplished with a minimum amount of friction, which is very desirable in agricultural implements because in various steering devices employed in agricultural implements heretofore used, there has been a certain amount of friction in the turning of the front wheels which causes the same to open great furrows in the soft ground, whereas in the new steering device for wheeled frames as shown in the drawings and more fully hereinafter explained, the front wheels turn each in a separate arc but the center of each arc of each front wheel coincides with the center of the arc of the other front wheel at a common point disposed along a line running transversely of the frame beneath the hub portions of the rear wheels.

Another object of this invention is to provide a steering means by which either front wheel may be turned to a right angle with a line from it to the ground point of the rear wheel on the same side of the frame and the other front wheel will be turned in an arc concentric with the arc of opposite front wheel, thus making it possible to turn the vehicle on the ground point of either rear wheel at will, causing the vehicle to turn on the radius of the length of its wheelbase.

Another object of this invention is to provide a frame for all kinds of agricultural implements, automobiles, tractors, and the like in which the frame can be turned within its own length and in which the front wheels can be turned far enough to cause the frame to turn with one of its rear wheels as a pivot without the necessity of turning the steering mechanism up to the dead centers of the steering mechanism.

Some of the objects of the invention having been stated, other objects will appear as the description proceeds, when taken in connection with the accompanying drawings, in which—

Figure 1 is an elevation of the wheeled frame showing the improved steering apparatus associated therewith;

Figure 2 is a plan view of the wheeled frame;

Figure 3 is a front elevation of the wheeled frame;

Figure 4 is an enlarged cross sectional detailed view taken along the line 3—3 in Figure 2;

Figure 5 is a diagrammatic view supplementing the diagrammatic showing in Figure 2 as to the turning of the frame;

Figure 6 shows a modified form of a steering arm;

Figure 7 shows another modified form of a steering arm;

Figure 8 shows still another modified form of a steering arm;

Figure 9 shows still a further form of a steering arm;

Figure 10 shows a modified form of steering means.

Referring more specifically to the drawings, the numerals 10 and 11 indicate the side frame members of any wheeled frame having a seat 12 secured at the rear end thereof and stirrups 13 together with a brace 14 for supporting a steering rod 15 having a steering wheel 16 thereon, said steering rod having a collar 17 disposed in close proximity to brace 14. A plate 18 is secured between frame members 10 and 11 and by means of U-bolts 19; the frame work is secured to an axle 20 for the rear wheels 21 and 22. Suitable braces 23 and 24 are secured around the axle 20 and to the frame members 10 and 11 respectively.

At the front end of members 10 and 11 a cross-piece 25 is secured thereto, said crosspiece being secured to front end of frame members 10 and 11 and extending beyond the frame members 10 and 11 at each side thereof and being bent backwardly and secured to the frame members 10 and 11 by means of bolts 26 and 27. Suitable housings 29 and 30 are secured on the inside of the curved portions of end frame member 25 by means of suitable bolts 31. In each of the housings 29 and 30 are mounted sleeves 32 and 33 (see Figures 3 and 4). Sleeves 32 and 33 have rotatably mounted therein vertically disposed shafts 34 and 35 which have collars 36 and 37 fixedly mounted thereon at the lower end of the sleeves 32 and 33.

Encircling the sleeves 32 and 33 are U-bolts 38 and 39 to which are secured braces 40 and 40a which are secured to the frames 10 and 11 respectively by means of the bolts 27 and 26 respectively. The lower ends of shafts 34 and 35 are bent horizontally and have mounted thereon the front wheels 41 and 42.

On the upper end of shaft 35 is loosely mounted a link 44 which is pivotally secured as at 44a to a connecting rod 45, which has downwardly projecting spaced pins 46 and 47 therein and the other end of connecting rod 45 is connected as at 48a to the free end of a link 48 loosely mounted on the upper end of shaft 34.

Immediately beneath link 44 is fixedly secured to shaft 35 a slotted lever 50, having a slot 51 therein in which is mounted a roller 52, said roller 52 being rotatably mounted on screw 53 secured on connecting rod 45. Near the other end of connecting rod 45 a roller 55 is rotatably secured on a sleeve 59 mounted on screw 56 and this roller is adapted to have movement in slot 57 in lever 58, which lever 58 is fixedly secured to the upper end of shaft 34 by means of pins 60 and 61.

It may here be stated that lever 50 is, likewise, secured to shaft 35 but is not shown in the drawings. Lever 58 has integral therewith a gear 64 which is adapted to mesh with a bevel gear 65 on steering rod 15, which rod 15 at its lower end is supported in a bracket 66 secured to frame member 25.

Secured by means of bolts 70 and 71 to front frame member 25 is a curved member 72 adapted to support the members 74 and 75 which are pivotally secured as at 76 to front frame member 25 and a tongue member 78 is secured in members 74 and 75 by means of bolts 79. Bolts 80 and 81 also penetrate tongue member 78 and straps 82 and 83 to form a rigid tongue so that the device may be propelled by the tongue 78 from in front if desired or if desired, the framework may be self-propelled, and in either event, the steering wheel 16 is useful in steering the front wheels especially when the frame is used for a cultivator frame, so that the cultivator plows can be steered around projecting plants in a row. Where the vehicle is self-propelled the steering apparatus comprising steering wheel 16 and steering rod 15 and associated parts can be used exclusively for directing the vehicle.

If it it desired to cause a slight turn of tongue 78 to steer the front wheels, then a suitable bolt may be dropped thru hole 85 in connecting rod 45 and thru slot 86 in member 74.

In Figure 2 the front wheels are shown in dotted lines as being turned to a point where wheel 41 is disposed 90 degrees from a line drawn longitudinally thru wheel 22 and it is there seen that wheel 42 describes arc 89a, whereas, wheel 41 describes arc 89b, and line 89c passing thru the axis of wheel 42 meets line 89b passing thru a line 88 in alinement with the axis of wheels 41 and 42 at the point 89e which is exactly the point at which wheel 22 rests on the ground so that in this position the frame can be turned with wheel 22 as a pivot and the front wheels will describe arcs with the left rear wheel at the pivot point. No friction is imparted to any of the wheels in the turning movement.

In the diagrammatic view in Figure 5 it is seen that when wheel 42 is turning along arc 90a and wheel 41 is turning along arc 90b and the radius 90c passes thru the axis of wheel 42 and runs to the point 90e of line 88 said line 88 passing immediately below the center of both the rear wheels 21 and 22 and also it is seen that line 90d passing thru the axis of wheel 41 meets radius 90c at point 90e and, therefore, both wheels are turning in separate arcs, each arc having its radius emanating from a common point. While turned in this position wheel 41 is describing an arc having radius 90f. When the wheels are further turned so that wheel 42 describes arc 91a and wheel 41 describes arc 91b, it is seen that the axis 91c of wheel 42 is pointing to point 91e, whereas a line 91d passing thru the axis of wheel 41 also points to the same point on line 88, namely 91e with the wheel 41 describing an arc having a radius 91f.

It is thus seen that regardless of the angle to which the front wheels are turned that a line passing thru the axis of one wheel coincides with a line passing thru the axis of the other front wheel at a point somewhere on a line 88 drawn transversely beneath the central point of the two rear wheels so that regardless of the degree of angularity of the turn, there is no friction whatever imparted to the front wheels due to their dragging on the ground or other surface which supports the wheeled frame.

Not only do the front wheels in turning describe arcs having a common center but the rear wheels also describe arcs having a common center with the arcs described by the front wheels.

In Figures 6 to 9 inclusive modified forms of slotted levers 50a, 50b, 50c and 50d are shown having slots 51a, 51b, 51c and 51d therein. In these figures only the structure associated with the right front wheel is shown, it being evident that a similar structure reversely positioned is associated with the left front wheel. These modified forms are shown for the purpose of illustrating some of the various ways in which the slots in the levers can be disposed to meet varying conditions.

It is evident that the rate of turn of the front wheels may be adjusted to cause them to describe arcs having approximately a common center by having a connecting rod with the rollers 52 and 55 disposed the same distance apart as shown in Figure 2 and to extend the connecting rod at each end to cause the distance between the point at which the rollers are mounted and the end of the connecting rod as shown by the points 44a and 48a at which the ends are connected to links 44 and 48 to be increased over the distance shown in Figure 2, to the extent that when left turn is made, for example, link 44 will move the roller 52 further out toward the outer end of slot 51 and, therefore, cause a slower turn of the right front wheel, because it increases the distance between shaft 35 and roller 52 and likewise at the same time on the wheel 41 the turning movement will be faster than the structure shown in Figure 2, because link 48 will pull roller 55 further in toward shaft 34 and decrease the radius or distance between roller 55 and shaft 34. It is evident that adjustments can be made by slight changes, as above pointed out to cause the front wheels to describe arcs having approximately a common center. By varying the distances "A" between the rollers and the ends of the connecting rod 45, the amount of and rate of turn imparted to the front wheels may be regulated to suit varying lengths and widths of wheel bases.

In Figure 10 is shown a slightly modified form of the invention in which the arms 90 and 91 are pivoted as at 92 and 93, which may be the shafts 34 and 35 or other suitable means connected to the wheels for turning the same, and these arms have slots 94 and 95 therein in which rollers 96 and 97 have movement which rollers are secured to a connecting rod 98 by any suitable means mounted on pins 99 and 100 and the ends of connecting rod 98 are pivotally secured as at 101 and 102 to links 103 and 104 respectively which links, at their other end, are secured as at 105 and 106 on arms 90 and 91. It is evident that by placing the points 105 and 106 at some suitable position between the pivot points 92 and 93 and the beginning of the slots 94 and 95 that for a given movement of connecting rod 98 which is similar to connecting rod 45, the turn imparted to the arms 90 and 91 will be at a greater rate than if arms 103 and 104 were pivoted at 92 and 93 as shown in Figure 2. It is also evident that the rate of turn imparted to arms 90 and 91 is dependent—among other things—on the position of pivot points 105 and 106, for if pivot points 105 and 106 are moving upwardly in Figure 10, the rate of turn of levers 90 and 91 would be greater than as shown in Figure 10.

In the drawings and specification, there has been set forth a preferred embodiment of the invention and although specific terms are employed, they are used in a generic and descriptive sense only and not for purposes of limitation, the scope of the invention being set forth in the appended claims.

It will be observed that with pin 85 omitted that the wheel can be steered by steering wheel 16 within a limited degree and the wheel will not be affected by the turning of tongue 78 and associated parts until the tongue has been turned far enough to the right or the left to engage one of the pins 46 and 47. It is, therefore, seen that upon turning of tongue 78 that the steering apparatus will be operated by the tongue when it engages one of the pins 46 or 47. Until the tongue has been turned to the point of engaging pins 46 or 47, the slight turning of tongue 78 will not affect the direction of the wheels but they will be steered by the steering wheel 16 and associated parts.

I claim:

1. In a wheeled frame having a framework and also having front and rear wheels, a pair of vertically disposed shafts on which the front wheels are mounted, a pair of inwardly and forwardly projecting slotted arms fixedly secured to said shafts, a pair of links loosely mounted at one end on said shafts, a connecting rod pivotally secured at its ends to the free ends of said links, means mounted on the connecting rod and projecting into the slots in said arms and means for simultaneously moving said arms, links and connecting rod to steer the frame.

2. In a wheeled frame having pairs of front and rear wheels, a vertically disposed shaft for guiding each front wheel, a link loosely mounted on each shaft, a connecting rod connecting the free ends of said links, a lever fixedly secured on each shaft, each lever having a longitudinally disposed slot therein, a roller in each of the slots, means for rotatably mounting said rollers on said connecting rod and means for moving the links, levers, shafts and connecting rods together to turn the front wheels to describe arcs having a common center.

3. In a wheeled frame having a pair of front wheels, a draft member pivotally attached to the front end of the frame, steering apparatus connecting the front wheels together for steering the same, means for moving the steering apparatus independently of the draft member, and means on the steering apparatus engageable by the draft member after the draft member has been swung on its pivot a predetermined degree for actuation of the steering apparatus.

4. Steering means for the front wheels of vehicles comprising pivoted means for mounting the front wheels, a pair of slotted arms having one end fixedly secured to each of said pivoted means, a link loosely secured at one end thereof on each of said pivoted means, a connecting rod pivotally secured to the other ends of said links, means on the connecting rod projecting loosely into the slots in said slotted arms and means for moving one of said pivotal means.

5. Steering means for a pair of wheels on a vehicle comprising pivoted means for mounting the pair of wheels, an arm fixedly secured on each of the pivoted means, a pair of links having one end thereof loosely mounted on the pivoted means, a connecting rod pivotally secured to the other ends of said links, means on the connecting rod for slidably engaging the arms and means for imparting rotative movement to one of the pivoted means to turn the same and to thereby impart movement to the other pivoted means.

6. Steering means for a pair of wheels in a wheeled vehicle comprising pivoted means for mounting said pair of wheels for pivotal movement around vertically disposed pivots, a pair of arms having one end thereof fixedly secured to said pivoted means, a pair of links having one end thereof loosely mounted on the pivoted means, a connecting rod pivotally secured to the other ends of said links, a sliding connection between the connecting rod and said arms and means for imparting rotation to one of the pivoted means to thereby move the arms and links to cause the two wheels in their travel to describe arcs having a common center.

In testimony whereof I affix my signature.

EUGENE M. COLE.